Jan. 18, 1927.  1,614,710
J. W. BRYCE
SCALE
Filed May 12, 1921     5 Sheets-Sheet 1

Inventor
James W. Bryce
By his
Attorneys
Kerr Page Cooper & Hayward

Jan. 18, 1927. 1,614,710
J. W. BRYCE
SCALE
Filed May 12, 1921   5 Sheets-Sheet 2
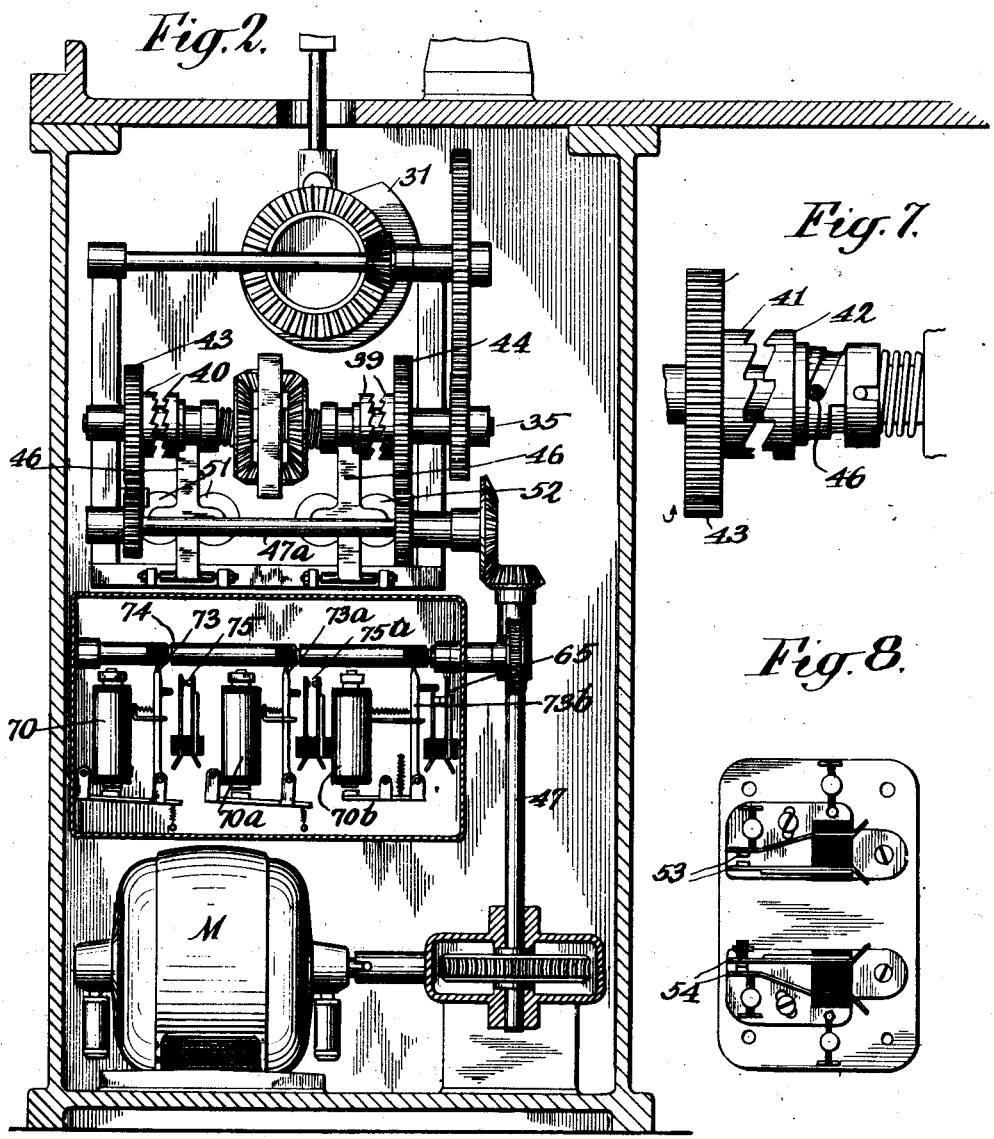
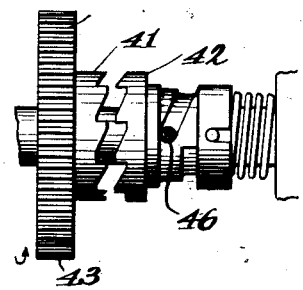
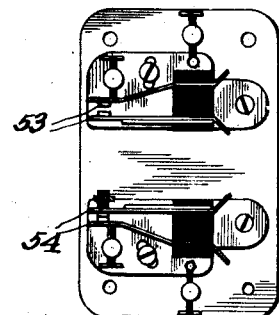
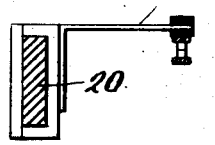
Inventor
James W. Bryce
By his Attorneys
Kerr Page Cooper & Hayward Jan. 18, 1927. 1,614,710
J. W. BRYCE
SCALE
Filed May 12, 1921   5 Sheets-Sheet 3

Inventor
James W. Bryce
By his Attorneys
Kerr Page Cooper & Hayward

Jan. 18, 1927.  
J. W. BRYCE  
SCALE  
Filed May 12, 1921   5 Sheets-Sheet 4

1,614,710

Inventor  
James W. Bryce  
By his Attorneys  
Pen Page Cooper & Hayward.

Patented Jan. 18, 1927.

1,614,710

UNITED STATES PATENT OFFICE.

JAMES W. BRYCE, OF BINGHAMTON, NEW YORK, ASSIGNOR, BY MESNE ASSIGNMENTS, TO DAYTON SCALE COMPANY, OF DAYTON, OHIO, A CORPORATION OF NEW JERSEY.

SCALE.

Application filed May 12, 1921. Serial No. 468,835.

This invention relates to improvements in weighing scales and is more particularly directed to improvements in load offsetting devices to the end that weighing operations may be carried expeditiously and accurately.

The detailed objects of the invention will be more fully set forth in the accompanying specification and drawings and specifically defined in the appended claims.

In the drawings,

Fig. 2 is an enlarged detail of the clutches and driving connections to the weight carrier cam.

Fig. 7 is a detail view of one of the magnetically controlled clutches.

Figs. 8 and 9 are details showing the beam actuated contacts and the bracket for actuating the same from the beam.

Figure 1:
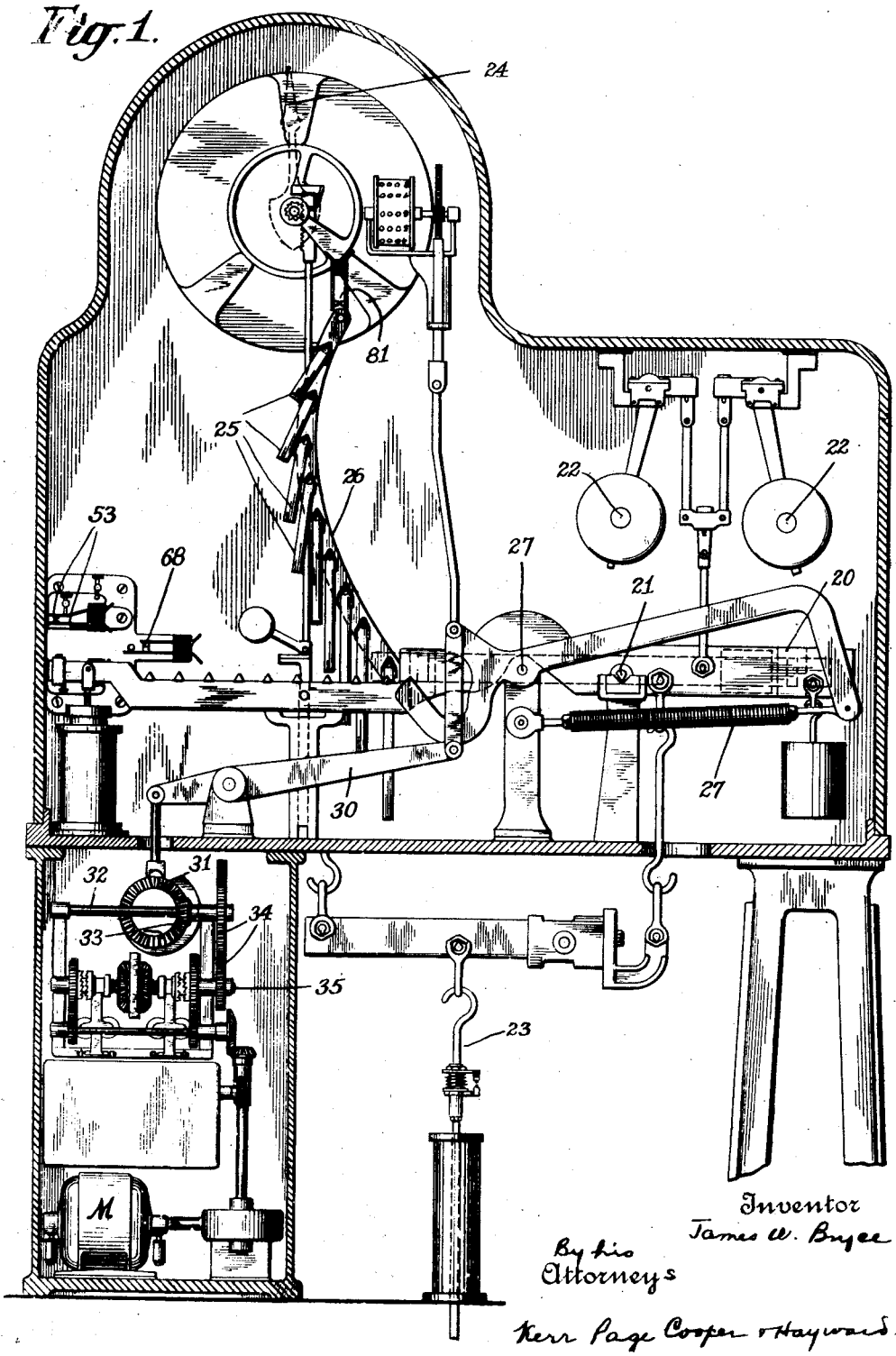
Fig. 1 is a rear elevation view of the scale with cover removed.
Figure 3:
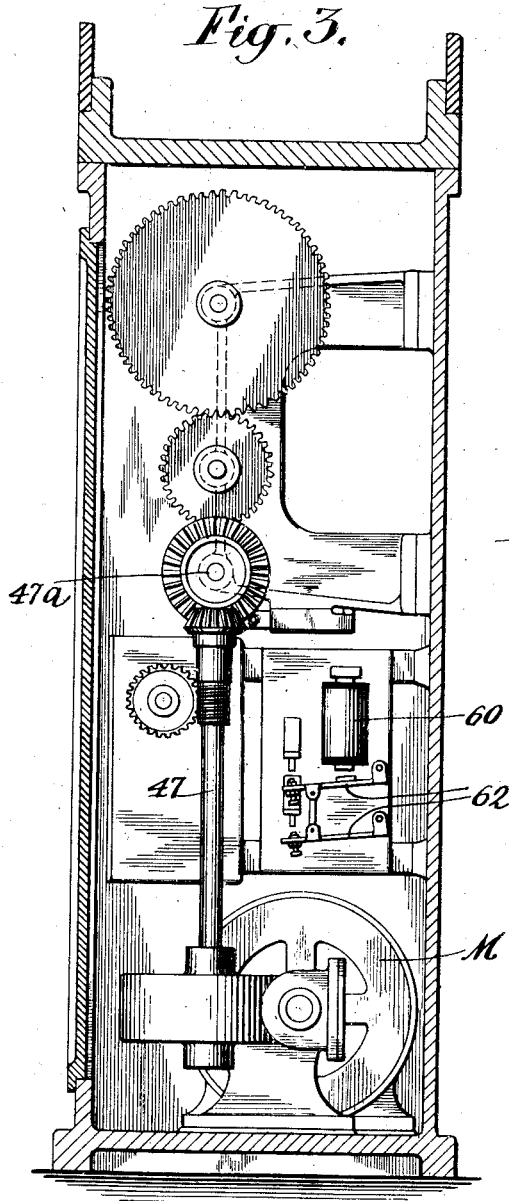
Fig. 3 is a side view of the parts shown in Fig. 2.

The scale to which I have illustrated my invention as applied is of a type well known in the trade as an International No. 602 scale. It is to be understood, however, that the present invention is not to be limited to use in connection with this particular form and type of scale and that this particular scale is used merely for convenience in illustration and description since its general construction and operation are well known in the art.

In general, the scale comprises a beam 20 fulcrumed at 21 and having an automatic counterbalancing system such as pendulum 22 connected thereto. A draft rod 23 connects with the usual base lever system and the weight of the load may be transmitted through an intermediate lever and linkage to the beam 20. A pivotal indicator 24 suitably operated from the beam displays the amount of the automatically counterbalanced load.

When the applied load exceeds the capacity of the automatic counterbalance additional loads may be offset by depositing one or more capacity weights 25 upon the beam. These capacity weights are carried by a weight carrier 26 which is journalled at 27 and counterbalanced by the usual spring $27^a$. The amount of the load offset by the capacity weights is indicated upon a capacity weight indicator, which is suitably interconnected to the weight carrier to be variably displaced thereby in accordance with the applied capacity weights.

Heretofore it has been the practice to manually apply the capacity weights and to manually remove the same from the beam.

In the present invention I not only automatically apply the capacity weights as needed, when the live load exceeds the capacity of the automatic counterbalance plus the amount of load offset by any capacity weights already upon the beam, but I also automatically remove the weights as required.

The capacity weights are either automatically applied or removed as needed and the weight changes are effected without carrying the weight carrier through any predetermined cycle such as one, for example, in which the complete set of weights must be applied or removed prior to the selection and removal or application of a single weight.

Figure 14:
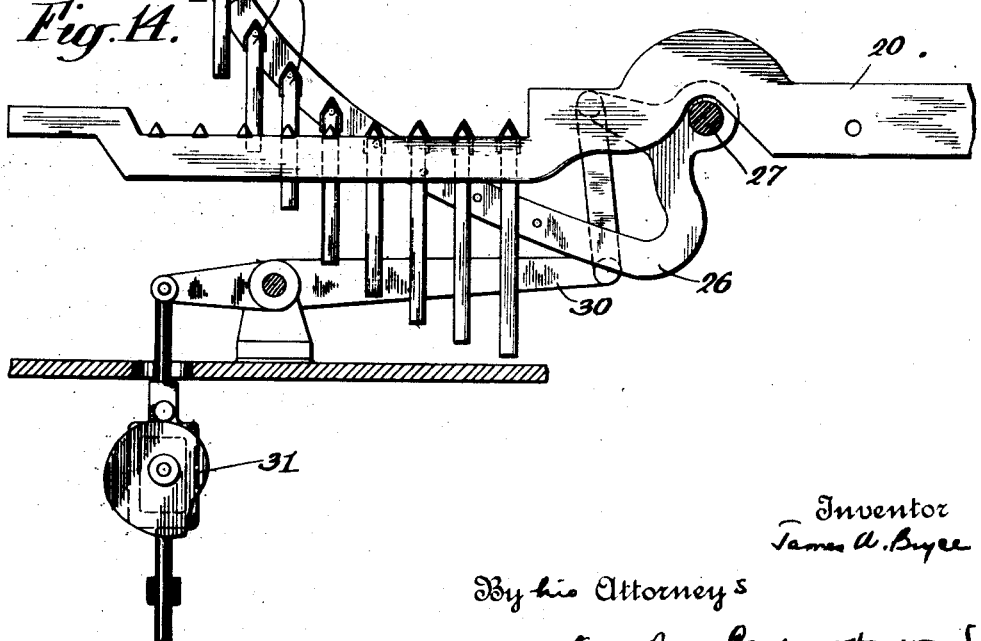
Fig. 14 is an enlarged detail view of the weight carrier and associated scale beam.

In order to actuate the weight carrier I connect it with a rock lever 30 which through a suitable cam follower is variably displaced by a controller in the form of a cam 31 upon shaft 32 (see Figs. 1, 2 and 14). The cam is arranged to be variably displaced so as to cause the weight carrier to apply one or more weights to the beam and upon reversing the direction of motion of the cam the weights are automatically removed by means of spring $27^a$. A power drive to the cam is secured through bevel gearing 33 and spur gears 34 from a shaft 35. Shaft 35 is arranged to be selectively clutched to a power motor so that the weight carrier cam will be either rotated forwardly or rearwardly depending upon whether weights are to be applied or removed.

Figure 10:
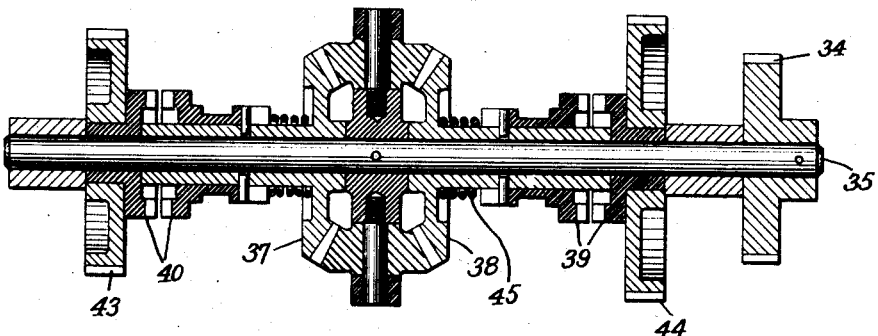
Fig. 10 is a detail sectional view of the driving gearing for the weighing changing device.
Figure 11:
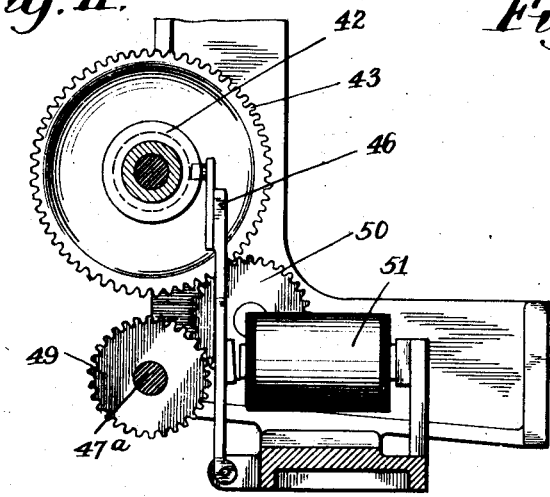
Fig. 11 is an end view of these parts and their associated clutch magnet.
Figure 12:
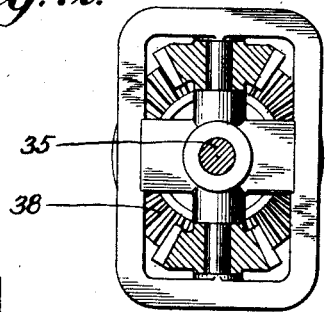
Fig. 12 is a detail view of the differential device used in the gearing shown in section in Fig. 10.

To control this operation and to lock the cam and associated parts in desired position between weight changing operations, I provide the construction which will now be described. Shaft 35 has fastened to it the spider 36 of a differential gearing mechanism including ring gears 37—38. Upon the sleeve-like ends of these gears are clutches 39 and 40. These clutches are best shown in Figs. 7, 10 and 11 and comprise jaw elements 41 and 42, the former attached to gears 43 or 44 (Figs. 2 and 11) and the latter 42 being splined on the sleeve-like ends of gears 37 and 38 and are normally urged into clutching engagement by springs 45. Disengagement of these clutches is secured by magnetically actuated arms 46 which engage in cam grooves in the clutch elements 42 and disengage the jaws thereof. The arms further serve to lock the clutch elements 42 in a predetermined position when the jaws are disengaged (see Fig. 7).

Gears 43 and 44 are driven in opposite directions by means of a motor M. This motor is connected by suitable reducing gearing and shaft 47 to a cross shaft 47ª carrying two pinions 48 and 49. The former meshes directly with gear 44 and the latter meshes with an idler 50 which drives gear 43 (see Fig. 11).

It will be understood that there is an arm 46 for each clutch and that two clutch magnets 51 and 52 are employed. By energizing magnet 52 clutch 39 will be engaged and the cam 31 will be driven forward. If, on the other hand, magnet 51 be energized, the cam 31 will be operated in reverse direction. Capacity weights will be successively applied so long as 52 remains energized and these weights will be successively removed so long as magnet 51 is energized, provided the motor M is rotating. With both magnets deenergized, the weight carrier will remain stationary and be locked by the clutch arms.

To control the energization of the clutch magnets 51 and 52, I provide controlling contact devices comprising adjustable contacts 53 and 54. These contacts are mounted in proximity to the beam and are actuated by an arm 55 carrying a suitable insulated block thereon, which extends from the scale beam 20 (see Figs. 1, 8 and 9). Suitable provision is made for adjusting these contacts as shown in Fig. 8. The contacts 53 are adapted to be closed when the counterbalance 22 reaches the limit of its travel and 54 are closed by the beam when the beam recedes to its normal no load position. (This position is likewise assumed by the beam when the applied load is overbalanced by the applied capacity weights.)

Figure 15:
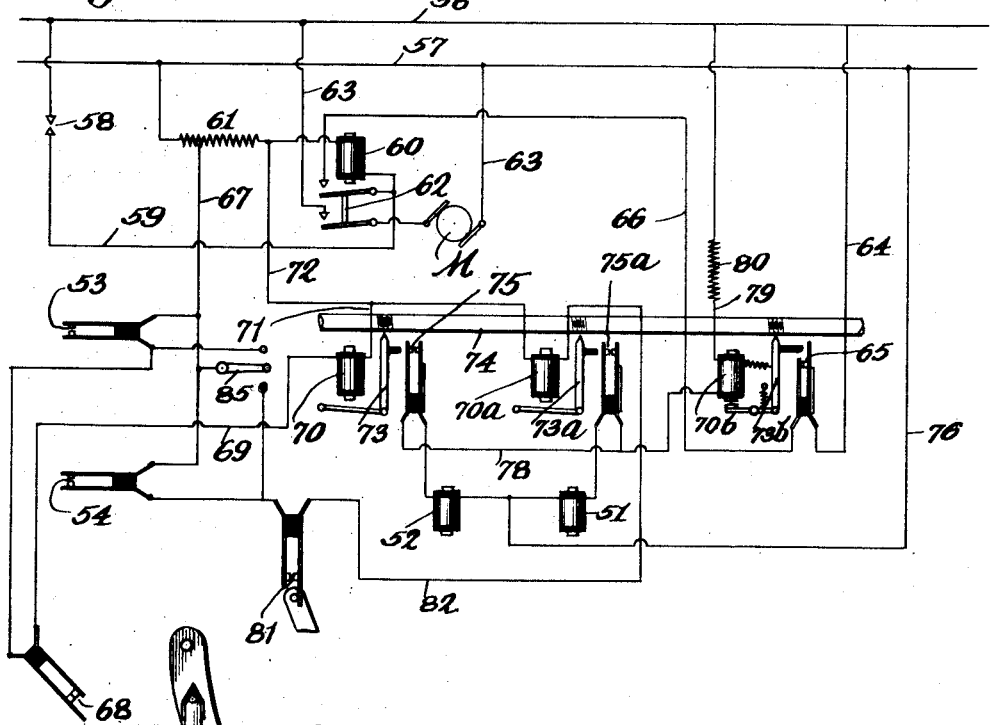
Fig. 15 is a circuit diagram showing the entire set of electrical connections.

The mode of operation of the machine thus far described may be best understood by referring to the circuit diagram shown in Fig. 15. Electric current is supplied from a suitable source through main lines 56 and 57. When a weighing is to be made a suitable switch 58 such as a push button is manually closed. If desired this circuit may be closed automatically by a suitable draft rod switch 58ª (Fig. 1). Current now flows from line 56 through the said switch 58, wire 59, magnet 60, resistance 61, and back to line. The energization of magnet 60 actuates switch 62 placing motor M in a circuit 63 across the line. The motor now commences to rotate and will be maintained in operation after the opening of switch 58 by means of a stick circuit which is established from line 57 through resistance 61, magnet 60, wire 66, contacts 65, now closed, wire 64 and back to line 56. Under certain conditions, the contacts 65 may open at the commencement of an operation; but if capacity weights need be applied or removed these contacts will soon close and thereafter the stick circuit will be established and maintained. The operator under these conditions maintains 58 closed until the stick circuit is established by the closure of contacts 65. After the stick circuit is established the motor M will continue to rotate until contacts 65 are opened.

Figure 4:
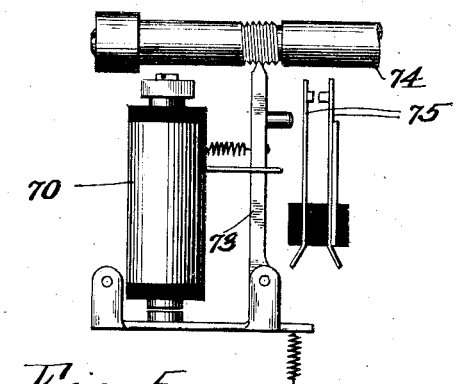
Figs. 4 and 5 are detail views of the mechanical actuated time relays.
Figure 5:
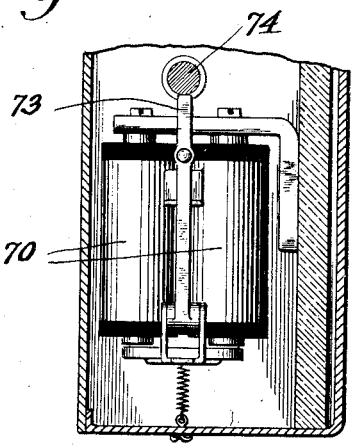
Figure 6:
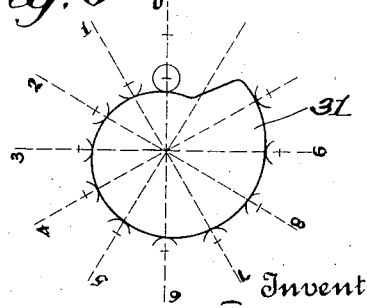
Fig. 6 is a detail view of the weight changing cam.

If a load be of such amount that the contacts 53 be closed signifying that a capacity weight is needed, a circuit will be established through a wire 67, contacts 53 now closed, contacts 68 now closed, wire 69, controlling magnet 70, wires 71 and 72 and back to the other side of resistance 61. I find that it is desirable to prevent excessive voltage across the controlling contacts 53 and by tapping the contact circuit 67—72 across a part of the resistance 61 undesirable voltages at the contacts are prevented. The magnet 70 being energized attracts its armature upwardly and engages a pointed plunger 73 in the threads of a slow rotating shaft 74. This shaft is in geared connection with shaft 47 (see Fig. 2) and is arranged to slowly feed the pointed plunger laterally to the right and after the lapse of an interval of time to cause it to close contacts 75. The detailed arrangement of this type of mechanically delayed relay are shown in Fig. 4 and corresponding reference characters will be employed when it is referred to hereafter, suitable prefixes being employed to distinguish the parts.

The closure of contacts 75 establishes a circuit from line 57, wire 76, clutch magnet 52, contacts 75, wire 78, magnet 70ᵇ, wire 79, resistance 80 and back to line 56. The clutch magnet then clutches the motor to the cam 31 which actuates the capacity weight changing device and weights are successively applied until the beam moves away from and opens contacts 53. With these contacts open, magnet 70 will immediately become deenergized allowing plunger 73 to drop away from the screw shaft and permit contacts 75 to open. The clutch magnet will be then deenergized and further application of capacity weights will be stopped.

As an incident to the foregoing operation, magnet $70^b$ is energized. Plunger $73^b$ is normally held in engagement with the screw shaft 74 by means of a spring and is withdrawn therefrom upon the energization of magnet $70^b$. Consequently so long as weights are being changed contacts 65 will be kept closed. After the clutch magnet circuit has become deenergized, magnet $70^b$ will be deenergized, permitting the plunger $73^b$ to again contact with the screw shaft 74 and after a lapse of time open contacts 65 thereby opening the stick circuit and cutting out the motor.

The delayed closure of the control circuit to the clutch magnet and the rapid opening thereof are important for a proper operation of this type of scale since if the contacts 53 directly controlled the magnet 52 this magnet would be energized at improper times due to beam preliminary oscillation and on account of other vagrant contacts. This feature of my invention broadly is claimed in my copending applciation, Serial No. 469,834, filed May 12, 1921. The specific relay embodiment with a slow rotating shaft and a positively timed mechanical delay of closure is herein claimed.

If sufficient load be partially or entirely removed from the scale so that the beam 20 closes contacts 54, a circuit will be established through 67, contacts 54, contacts 81 now closed, wire 82, magnet $70^a$ and back to line. The energization of magnet $70^a$ after a lapse of time closes contacts $75^a$ and establishes a circuit to clutch magnet 51 whereby weights are successively removed from the beam until the beam moves away from the contacts 54. If this operation is attempted after the motor has stopped its rotation, it will be first necessary to close the push button 58 and reenergize the motor controlling magnet 60.

It may occur that the applied load is greater than the combined offsetting capacity of all of the capacity weights plus the offsetting capacity of the automatic counterbalance. To stop the operation under these conditions, I provide the contacts 68 which are arranged to be opened by the weight carrier 26 when the latter reaches the extreme limit of its travel and has applied all of its weights. The opening of contacts 68 interrupts the circuit 69 to magnet 70 and stops the operation of the machine.

Figure 13:
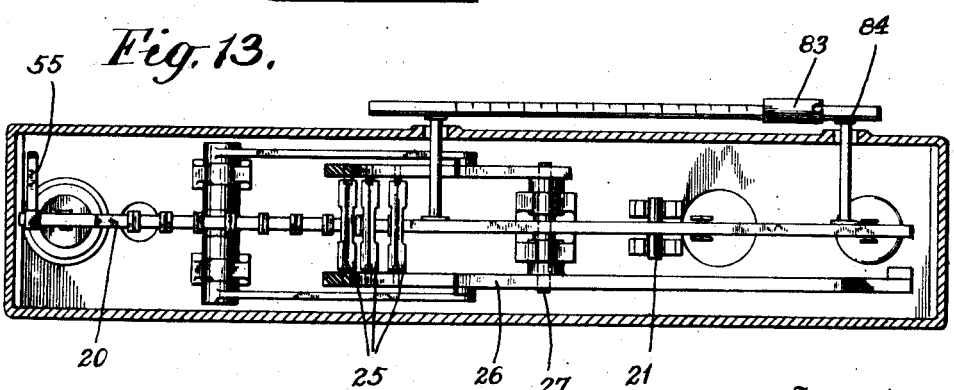
Fig. 13 is a sectional top plan view of the scale beams and associated weight carrier.

It may likewise occur that inadvertently, after a weighing operation is completed, that the tare poise 83 (Fig. 13) may have been left by the operator in displaced position upon the tare beam 84. Under such conditions the beam would be held firmly against the contacts 54 and would maintain these contacts closed even after the load was removed. Under these conditions the motor would tend to continue to run to remove imaginary capacity weights from the beam. To prevent this action I provide limit contacts 81 which are opened by the weight carrier when it is in extreme upper position.

On these scales, it is also desirable to provide a means for readily applying all of the weights to the beam, when it is desired to load up the beam and prevent shocks upon the upper mechanism from suddenly applied loads. It is also desirable to provide a means for removing all of the capacity weights for testing the zero of the scale. For this purpose, I provide a two way switch 85 connected to wire 67 which can be thrown to upper position to short circuit contacts 53 when all weights are to be applied. The same switch, when thrown over to its lower pole short circuits contacts 54 and removes all the weights from the beam.

When the foregoing switch 85 is used the limit contacts 68 and 81 will limit the extreme movement of the weight carrier and open the clutch circuit.

When the slow relay $70^b$—$73^b$ etc. has been so actuated as to open contacts 65, all circuits in the machine will be open so that there will be no current consumption with the machine at rest. This will be understood since when magnet 60 is deenergized there will be no flow of current across resistance 61 and consequently there will be no current flow in the circuits 69 and 82. Magnets 70 and $70^a$ will then both be deenergized allowing the plungers 73 and $73^a$ to both drop to lower position opening contacts 75 and $75^a$ and thereby stopping further flow of current.

What I claim is—

1. In a weighing scale, in combination with a scale beam, a plurality of load offsetting weights, means for applying said weights to the beam and for removing them therefrom, a power driving means, and automatically operable means comprising in part electric contact devices actuated by the beam for alternatively actuating the weight applying means by said power driving means to apply weights to said beam or to positively control the removal of weights therefrom.

2. A weighing scale comprising in combination with an automatically counterbalance scale beam, capacity weights adapted to be applied to parts applying load offsetting force to said beam for increasing the capacity of the scale beyond the range of the automatic counterbalance capacity weight changing means, including an electric driving motor adapted to positively drive the capacity weight changing means to apply additional weights and means including electric contact devices actuated by the beam for controlling the operation of the motor and of the weight changing devices so as to effect either an initial removal or application of additional weights as required.

3. In a weighing scale, in combination, a scale beam, an automatic counterbalance therefor, capacity weights adapted to be applied to said beam for increasing the capacity of the scale beyond the range of the automatic counterbalance, a capacity weight changing mechanism, a controller therefor, a driving motor, driving connections from the motor to the controller, and electric contact devices controlled by said beam to control the adjustment of said driving connection, whereby weights may be optionally and directly applied or removed according to the status of the beam.

4. In a weighing scale of the automatic type having a scale beam, capacity weights for application thereto, and a capacity weight applying means, in combination, a motor, means actuated thereby for advancing the capacity weight applying means to deposit weights upon the beam, said means when actuated reversely by the motor permitting the removal of capacity weights therefrom, and means operated by the beam for selectively controlling the direction of drive of the aforesaid means whereby weights may be selectively applied or removed as needed.

5. In a weighing scale of the automatic type having a capacity weight changing device with provisions for removing or applying capacity weights to a part of the scale, in combination with a scale beam, a driving motor, means for actuating the capacity weight device therefrom, said means comprising a pair of clutch devices and means for selectively engaging one or the other of the same to apply or remove capacity weights.

6. In a weighing scale having a scale beam and a capacity weight load offsetting means therefor, said means including capacity weights adapted to be applied or removed to or from a moving part of the scale, and means for applying or removing the same, a motor, forward and reverse driving devices intermediate the motor and said means, and electrical contact devices actuated by said beam for selectively controlling said connections.

7. In a weighing scale having a scale beam, an automatic counterbalance, and a capacity weight load offsetting means, capacity weights adapted to be applied or removed to or from a moving part of the scale, a motor, driving devices from said motor to said means, and a pair of clutches associated therewith for selectively controlling the direction of actuation of the said load offsetting means, and means for selectively actuating one or the other of the said clutches according to the position of the beam, to either remove or apply capacity weights, and means for controlling the disengaging of the said clutch when the proper capacity weights have been removed or applied to the beam.

8. In a weighing scale, in combination, a scale beam, an automatic counterbalance therefor, a capacity weight load offsetting means, capacity weights adapted to be applied or removed to or from a moving part of the scale, a motor, driving devices from said motor to said means including a pair of magnetically controlled clutches, a pair of contacts associated with the beam, and means operable upon the contact of the beam and one or the other contacts for engaging one or the other clutch, and means operable upon the retraction of the beam from the said contact for disengaging the previously engaged clutch and thereby stopping further change in the capacity weight load offsetting means.

9. In a device of the class described, a scale beam, a load offsetting means therefor, and means for controlling the operation thereof, said means including a driving motor, a part driven thereby, a contact device actuated by the scale beam, a circuit therefor, a control circuit and a timed relay mechanically actuated by the part driven by the motor and having a controlling magnet energized upon the closure of the first circuit for establishing the control circuit after a certain time period.

10. In a device of the class described, in combination, a scale beam, a load offsetting means therefor, means for controlling the operation thereof comprising a pair of contacts actuated by the beam, contact circuits therefrom, a controlling circuit, a switch for said control circuit, and means for actuating said switch at a delayed time period after the closure of the beam actuated contacts, said means comprising a magnet controlled by the contact circuit, and a mechanically actuated member controlled thereby and mechanically displaceable to actuate the control switch after the lapse of a predetermined time.

11. In a weighing scale, a scale beam, load offsetting means, a motor for controlling the same, control means for said motor including beam actuated contacts, a circuit therefrom, a second control circuit and a slow acting magnetically controlled mechanical relay actuated mechanically by said motor to delay the closure of the control circuit for a predetermined period after the closure of the contact circuit.

12. In a weighing scale, in combination, a scale beam, a capacity weight carrier, capacity weights carried thereby and adapted to be removed from or applied to the beam, a motor for driving the said carrier, electric controlling devices to control the operation of the carrier by the motor, said devices, including beam actuated contacts and circuits, and limit switch devices to interrupt the said circuits irrespective of the condition of the beam actuated contacts upon the weight carrier assuming an extreme position.

13. In a weighing scale, in combination, a scale beam, a plurality of capacity weights, a capacity weight carrier adapted to deposit one or more weights upon the beam, and remove the same therefrom, a motor for driving the said carrier, means for controlling the said driving of the carrier, said means comprising contact devices actuated by the beam, and supplementary manually operated switch devices having provisions for controlling the motor and adapted when operated to cause the motor to drive the carrier to an extreme position for the purpose described.

14. In a weighing scale having a beam and an associated capacity weight carrier, capacity weights therein for application to said beam, a motor for driving the same, and electrical controlling devices actuated by the beam for establishing or breaking the driving connection between the motor and the carrier, said devices including a manually operable switch adapted to be operated to one position to cause all the weights to be applied to the beam and adapted for operation to another position to cause all the weights to be removed from the beam.

15. In a weighing scale, in combination, a beam and an associated weight carrier, capacity weights therein for application to said beam, a motor for driving the same, and electrical controlling devices actuated by a moving part of the scale for coupling and uncoupling the motor and the said carrier, and limit contact devices actuated by the weight carrier to effect the uncoupling of the driving motor when the weight carrier has reached its limit of travel.

16. In a weighing scale comprising a scale beam, an automatic counterbalance, a capacity weight carrier, capacity weights therein for application to said beam, a controlling cam, a motor, forward and reverse clutches intermediate the motor and said controlling cam, electric controlling devices for said clutches, said devices including a plurality of controlling contacts actuated by the beam, said contacts when actuated selectively controlling the selection of the clutches to be engaged and when opened by the retraction of the beam causing the disengagement of both clutches.

17. In a weighing scale in combination with a scale beam, a capacity weight carrier, capacity weights therein for application to said beam, a motor for driving the same, a plurality of driving connections intermediate the motor and said carrier adapted to drive the carrier forward or reversely, magnetically controlled clutches with each of said connections, and controlling devices therefor actuated by said beam and adapted when the beam is in one position to engage one clutch, when the beam is in another position to engage the other clutch, and when the beam is in intermediate position to disengage both clutches.

18. In a weighing scale, in combination with a scale beam, a capacity weight carrier, capacity weights therein for application to said beam, of an actuating motor therefor, clutch devices and means for selectively operating the same to couple the motor and the carrier and advance or return the same, and a pair of contact devices actuated by the beam, one contact when actuated selecting one clutch and the other selecting the other clutch.

19. A weighing scale comprising an automatically counterbalanced scale beam, capacity weights adapted to be applied or removed from parts associated with said scale beam, capacity weight changing devices, means for operating the same for either removing or applying capacity weights, a controlling element for said last mentioned means, means including a motor for driving and positioning said part, means for controlling the driving and positioning of said element by said motor comprising electric contact devices actuated by the beam, said last mentioned means having provisions for so controlling the operation as to effect either an initial removal or application of weights as required.

20. In a weighing scale having capacity weight changing devices including means for applying or removing one or more weights to or from parts operatively associated with the weighing scale, and means for controlling the operation thereof to effect either the automatic removal of or the automatic application of weights, without manual intervention, in combination with means brought into operation by the position of certain parts of the scale for automatically interrupting the operation of the weight changing devices upon the application of all the weights thereby.

21. In a weighing scale having capacity weight changing devices which apply or remove one or more weights one after the other to or from the weighing scale and means for automatically controlling the operation thereof in accordance with applied loads to effect automatic removal of or automatic application of weights, and means automatically called into action upon the removal of the last weight for automatically interrupting the operation of the weight changing devices.

22. In a weighing scale having in combination capacity weight changing devices which apply or remove one or a plurality of weights to or from operative parts of the weighing scale and means controlled by the scale for automatically controlling the operation of the same to effect either the removal or application of weights, and means for rendering the aforesaid controlling means inoperative to permit the application of all of the weights when desired.

23. In a weighing scale having in combination capacity weight changing devices which apply or remove one or a plurality of weights to or from operative parts of the weighing scale and means controlled by the scale for automatically controlling the operation of the same to effect either the removal or application of weights, and means for rendering the aforesaid controlling means inoperative to permit the weight changing devices to automatically remove all of the weights when desired.

24. In a weighing scale having in combination capacity weight changing devices which apply or remove one or a plurality of weights to or from operative parts of the weighing scale and means controlled by the scale for automatically controlling the operation of the same to effect either the removal or application of weights, and means for rendering the aforesaid controlling means inoperative to permit the weight changing devices to be alternatively actuated to automatically apply or remove all of the weights as desired.

In testimony whereof I hereto affix my signature.

JAMES W. BRYCE.